No. 735,979. PATENTED AUG. 11, 1903.
G. HOEPNER.
AUTOMATIC WEIGHING MACHINE.
APPLICATION FILED AUG. 4, 1902.
NO MODEL. 4 SHEETS—SHEET 3.

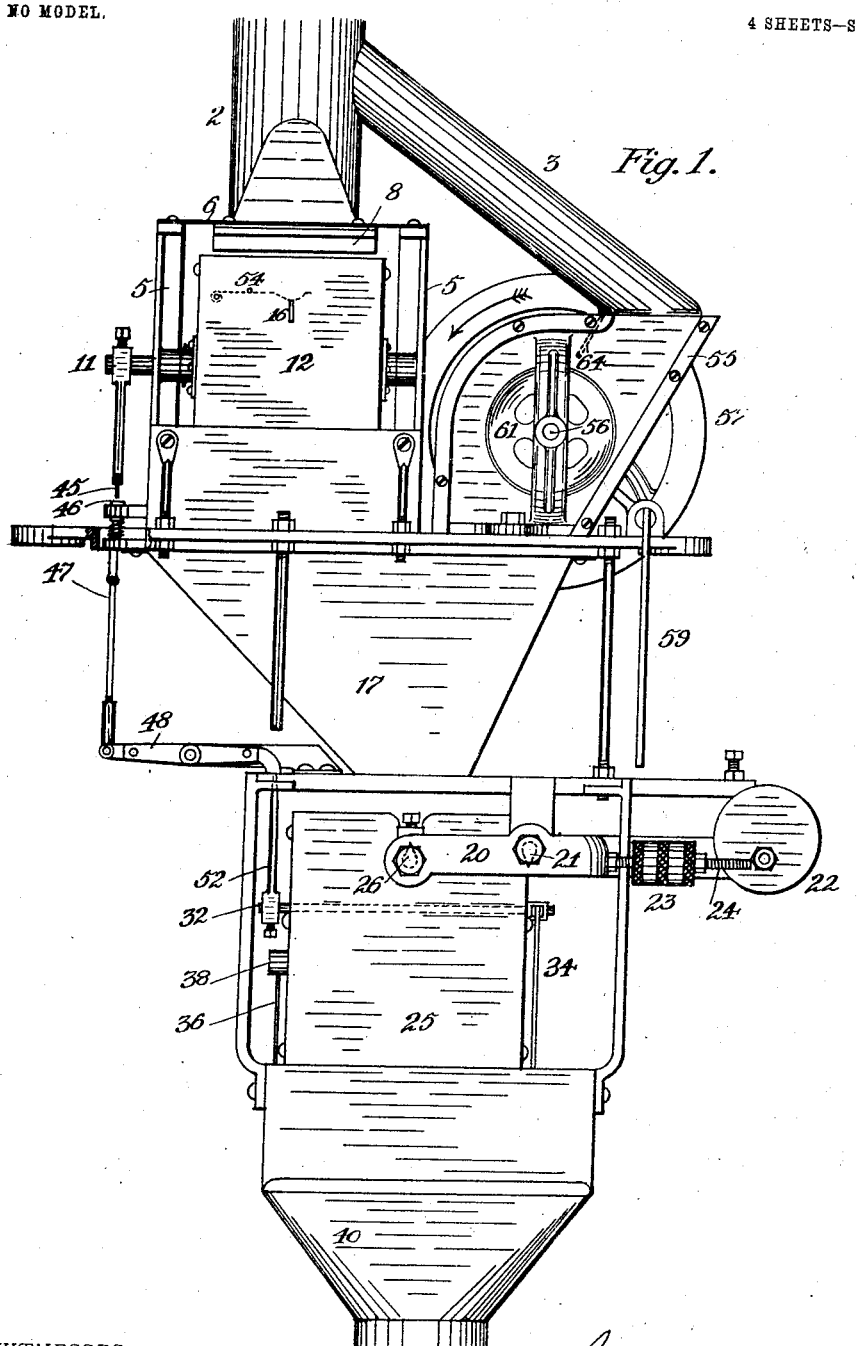

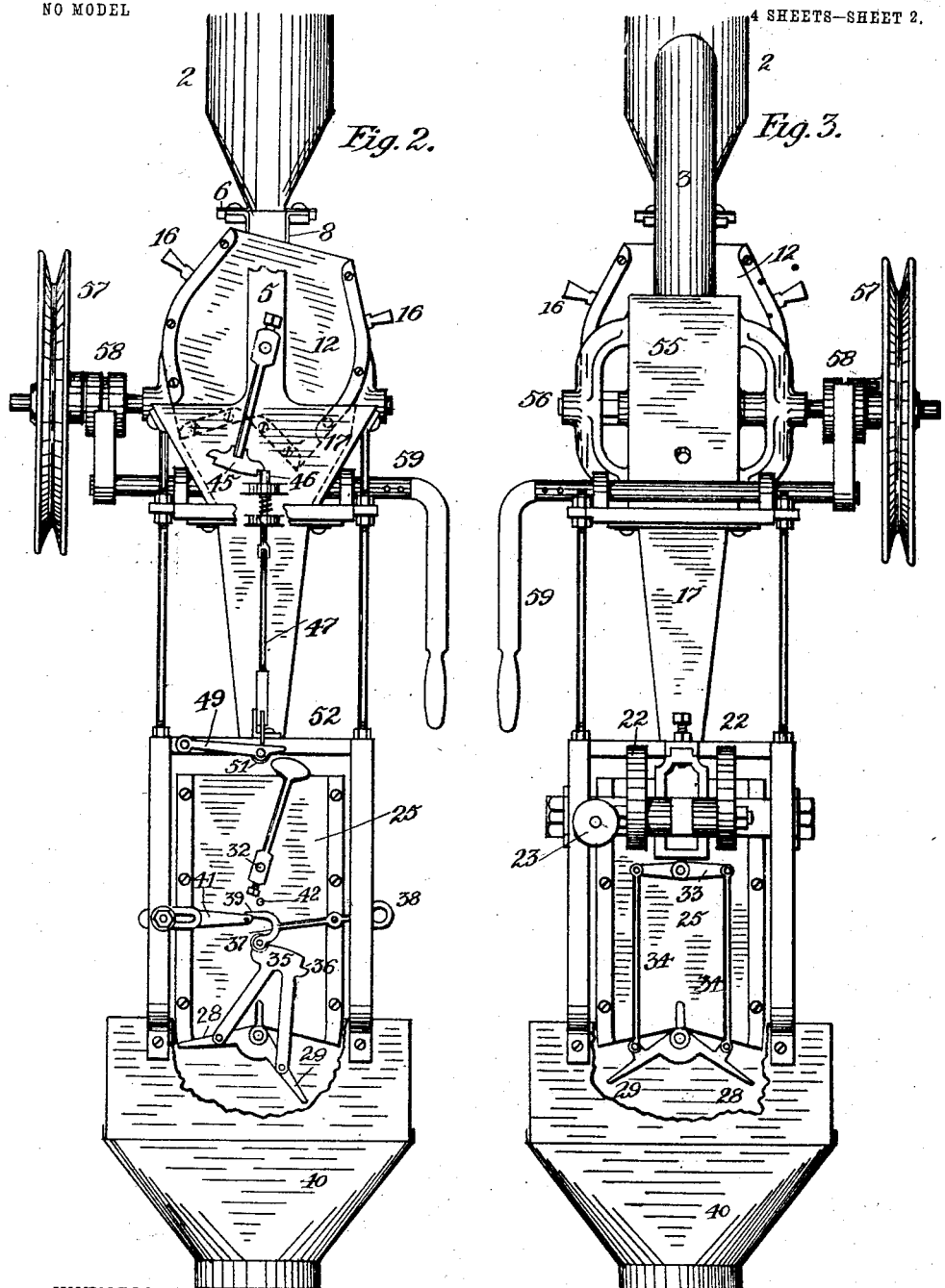

WITNESSES: INVENTOR.
Louis C. Christie. George Hoepner
F. W. Burt. BY
 Spear Seely
 ATTORNEYS.

No. 735,979. PATENTED AUG. 11, 1903.
G. HOEPNER.
AUTOMATIC WEIGHING MACHINE.
APPLICATION FILED AUG. 4, 1902.
NO MODEL. 4 SHEETS—SHEET 4.

WITNESSES:
Louis C. Christie.
J. M. Burt.

INVENTOR.
George Hoepner
BY
Spear Seely
ATTORNEYS.

No. 735,979. Patented August 11, 1903.

UNITED STATES PATENT OFFICE.

GEORGE HOEPNER, OF SAN FRANCISCO, CALIFORNIA, ASSIGNOR TO UNION SCALE AND MANUFACTURING COMPANY, OF SAN FRANCISCO, CALIFORNIA, A CORPORATION OF CALIFORNIA.

AUTOMATIC WEIGHING-MACHINE.

SPECIFICATION forming part of Letters Patent No. 735,979, dated August 11, 1903.

Application filed August 4, 1902. Serial No. 118,376. (No model.)

*To all whom it may concern:*

Be it known that I, GEORGE HOEPNER, a citizen of the United States, residing at San Francisco, in the county of San Francisco and State of California, have invented certain new and useful Improvements in Automatic Weighing-Machines, of which the following is a specification.

The invention relates to automatic weighing apparatus for receiving, weighing, and discharging correct amounts of predetermined weight into cans, sacks, packages, or receptacles of any character. Machines constructed according to it are especially intended for weighing dry products—such as grain, sugar, coffee, &c.—and the present improvements have, moreover, a special relation, although not a restricted relation, to products whose specific gravity varies somewhat, although supplied in a continuous uniform flow. This is the case with coffee-beans, for example.

In this connection the object of the invention is to provide the weighing-bucket with a feed of such a character that no matter how the specific gravity of the material may vary the weighing-bucket will operate to overbalance the scale-beam and discharge its contents with perfect accuracy. This feed is of a twofold character. The main part of the feed is supplied by a measuring device controllable as to capacity, but always regulated to measure and deliver successive charges each of which is of less weight than the weighing-bucket is adjusted to weigh. The other part of the feed is a minor quantity diverted from the main supply before it reaches the said measuring device and which is conveyed and delivered constantly into the weighing-bucket by a power-driven device—that is, independent of the bucket in its operation. This minor quantity, entering the bucket in a small though continuous stream, forms a constant accession to the separate charges received from the main measuring device, and hence makes up the short weight of such charges.

A practical embodiment of my invention is shown in the accompanying drawings, in connection with which this specification should be read.

Figure 4:
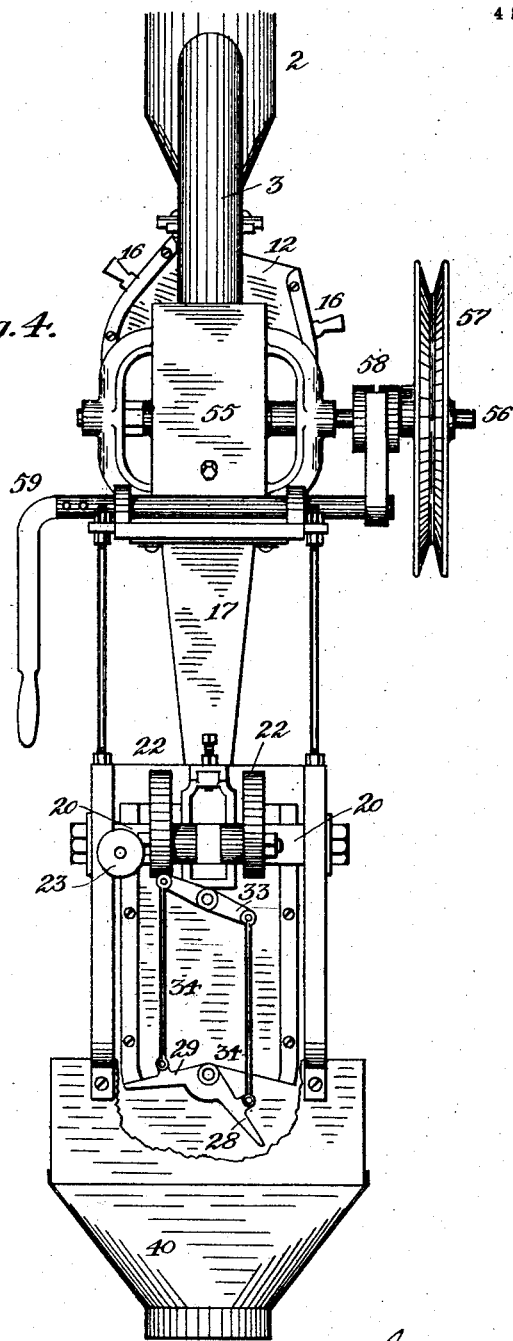
Figure 5:
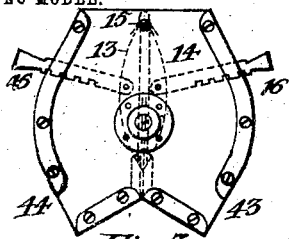
Figure 6:
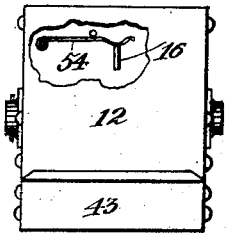
Figure 7:
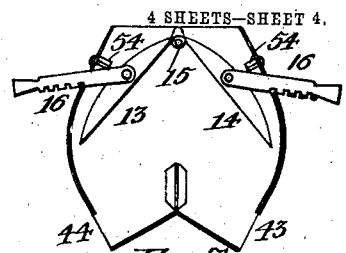
Figure 8:
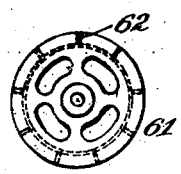
Figure 9:
Figure 10:
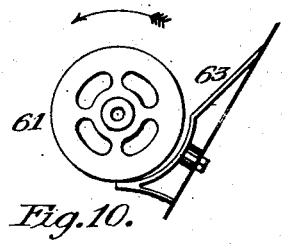
Figure 11:
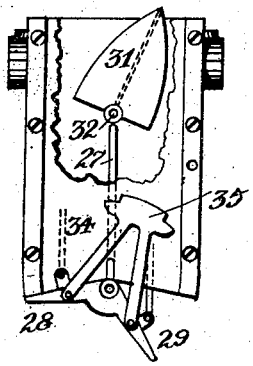
Figure 12:
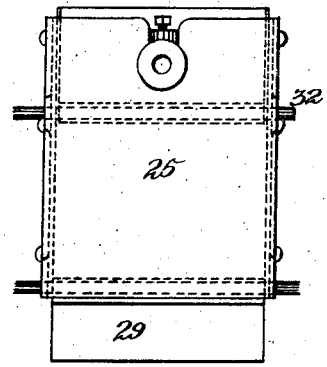
Figure 13:
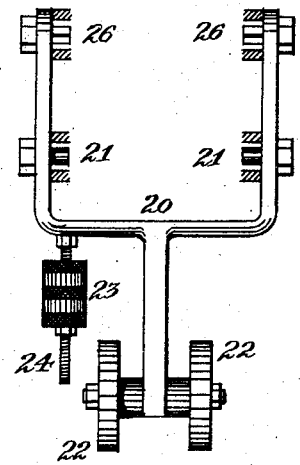

In the drawings, Figure 1 is a side elevation of the entire machine. Fig. 2 is a rear elevation, one compartment of weighing-bucket discharging. Fig. 3 is a front elevation, the bottoms of the weighing-bucket in the act of swinging to close one compartment and open the other. Fig. 4 is an elevation similar to Fig. 3, but with all parts in the opposite relation to those in Fig. 2. Fig. 5 is a side elevation of tilting tumbler with feed-controller entirely open. Fig. 6 is a front elevation of the same partly broken away. Fig. 7 is a section of the same, showing feed-controller adjusted to restrict the capacity of the tumbler. Fig. 8 is a side elevation of pocket-wheel for auxiliary feed. Fig. 9 is a plan view of the same. Fig. 10 is an elevation of the same together with its guard or shield. Fig. 11 is a rear elevation of the weighing-bucket, partly broken away. Fig. 12 is a side view of the same. Fig. 13 is a plan of main scale-beam.

The machine receives the material to be weighed from a hopper preferably connected to a pipe leading from a supply of such material or from such a pipe itself. The hopper or the pipe, as the case may be, is not shown in the drawings, but is free and unobstructed, so as to deliver the material continuously into a chamber 2, from which extends outwardly and at a downward incline the pipe 3, which diverts a small percentage of material. The main body of material, however, falls freely through chamber 2. The chamber 2 is supported by standards 5 5 and top plate 6, the standards being secured to the main frame of the machine. A slot in the top plate 6 registers with an elongated discharge-opening at lower end of chamber 2. Suspended at the side edges of the slot in the top plate are flexible converging curtains 8, preferably of soft rubber, which with the slot form a flexible discharge-passage from chamber 2 and which yield when necessary to prevent unusually large grains of material from obstructing the tilting of the tumbler described below.

A rock-shaft 11 is journaled in the standards 5, upon which is secured the oscillating measuring-tumbler 12. The tumbler is divided into two adjustable compartments by the independently-pivoted wings 13 14, hinged to and suspended from the horizontal rod 15 at its top. A rack-bar 16 projects from each wing through a slot in the side of the tumbler, enabling the position of said wings to be regulated so as to change the capacities of the compartments of the tumbler, the racks being locked in proper adjustment over the edges of the slots through which they project. In the bottom of the tumbler are two discharge-openings, through which material escapes alternately. One discharge is opened at each oscillation of the tumbler, while the other is closed by the inclined wall of the surrounding hopper 17, through which the material escapes to the weighing-bucket. By adjusting the wings 13 14 an estimated amount of material, continuously flowing, but which is less than the amount to be weighed, is delivered alternately through the individual compartments of the tumbler.

In this machine the current or flow of material is continuous, unobstructed, and unchecked throughout the entire machine from the inlet to the bucket in which it is weighed. The flow is diverted by automatic movements of the mechanisms; but the current is continuous throughout.

The hopper 17 is simply a means for conveying to the weighing-bucket both the main stream of material discharging through the tumbler and the minor stream which enters the pipe 3, as before described. The course, direction, and treatment of said minor stream, as well as its object and result, will be fully hereinafter explained. It is sufficient at present to say that such minor stream forms a continuous accession to the main stream, the two in the weighing-bucket forming a total mass sufficient to overbalance the scale-beam from which the weighing-bucket is suspended.

The scale-beam 20 is a yoke, Fig. 13, pivoted on knife-edges 21 in the main frame and having the counterweights 22 and the pea 23 adjustable on the threaded rod 24. The weighing-bucket 25 is hung by knife-edges 26 to the forks of the beam, and is therefore capable of a limited vertical movement up and down—up when it is empty and down when the weight of material carried by it is sufficient to overbalance the scale-beam. It is divided into two compartments by the vertical partition 27, Fig. 11, and has a hinged double bottom 28 29, which opens and closes the compartments alternately, so that they fill and discharge alternately. With the hinged double bottom coöperates the deflecting hinged gate 31, pivoted at the upper edge of the partition and which is tilted from side to side, Fig. 11, to divert the flow from hopper 17 into one or the other of the compartments of the bucket. The rock-shaft 32, upon which the gate is mounted, is connected by lever 33 and parallel rods 34 to the bottoms 28 29, Figs. 3 and 4, so that the movement of such bottoms is communicated to the swinging gate. At the side of the bucket opposite the parallel rods is the locking device, which holds either of the swinging bottoms closed until the bucket descends. A segment 35, having notches 36, swings through an arc of which the center is the hinge of the bottoms and at the end of each swing is engaged by the roller end of a latch 37, pivoted on the bucket and preferably weighted at 38. A projection 39 of the latch engages above and in contact with a fixed arm 41, secured to the frame of the machine. Thus in Fig. 2, for instance, the bottom 28 is closed and bottom 29 is open and both are locked in those positions by the engagement of the latch with one extremity of the notched segment. The left-hand compartment of the bucket is filling. When the weight is complete, the bucket overbalances the scale-beam and sinks, and as the latch is held by arm 41 the segment is released. The weight of material then opens bottom 28 and discharges through the chamber or funnel 40 into whatever receptacle has been placed to receive it. A pin 42 acts as a stop to limit vertical movement of the latch. To a bucket of this character a continuous feed is provided of a twofold character. First, there is a main feed consisting of automatically-measured charges through the compartments of the tilting tumbler, which form the main body of material in the bucket, and, secondly, this feed receives a continuous accession through the pipe 3. A charge of material from the tumbler is not of itself sufficient to operate the bucket; but the small accession constantly received by the bucket will enable the bucket to operate correctly.

The tilting tumbler 12 is swung by the weight of material in one side, so that the supply from chamber 2 is diverted successively from one side of the pivotal line of wings 14 to the other. Supposing, for example, that the tumbler, Fig. 5, is tilted, as in Fig. 2, then its right-hand compartment is discharging through outlet 43. Outlet 44 of the other compartment is closed by the wall of hopper 17 while that compartment is filling with the continuous stream from chamber 2. In either tilted position the tumbler is locked, and the locking means are controlled by the movements of the weighing-bucket. Reference is now to Figs. 1 and 2. The rock-shaft 11, upon which the tumbler is secured, carries a notched segment 45, substantially like segment 35. A spring-pressed bolt 46 slides in guides on a stationary part, such as hopper 17, and is jointed to a rod 47. A lever 48, pivoted on the frame, connects rod 47 to an arm 49, pivoted on the frame and having a roller 51. If the free end of arm 49 be raised, the bolt 46 will be pulled out of engagement with segment 45 and the tumbler will tilt, opening one discharge and closing the other. The controlling device is an oscillating cam 52 upon the rock-shaft 32, which carries gate 31. The cam swinging through an arc of which shaft 32 is the center will at each oscillation lift arm 49, and so release the tumbler.

Therefore at each sinking of the bucket and shifting of its bottoms and its deflecting-gate the tumbler will be released, will swing, will discharge a short-weight charge from one side, and will commence filling at the other. The flow is continuous from chamber 2, and, although diverted both in the tumbler and the bucket, it never ceases. Hence valves and stop-gates are absent from this machine. The amount of the short-weight charge is regulated by adjustment of the wings within the tumbler from their position in Fig. 5, through intermediate adjustments, to their position in Fig 7. The springs 54 in Figs. 6 and 7 are simply to hold the rack-bars 16 in positive engagement with the edges of the slots through which they project.

It has been stated before that the successive charges delivered by the tumbler are not in themselves of sufficient weight to operate the weighing-bucket. Neither is it necessary that they should more than approximate the correct weight, although they form by far the greater portion of the mass finally weighed. In weighing pounds, for instance, the tumbler may perhaps supply fourteen ounces at each discharge. The remainder is automatically and continuously made up by the small and constant stream diverted through the pipe 3.

Reference is now to Figs. 1, 8, 9, and 10. On the main frame of the machine is a casing 55, through which passes the journaled shaft 56, carrying a loose pulley 57, to which power is supplied by shafting a motor or in any suitable manner. A shifting clutch 58 on the shaft and the shipper-rod 59, Figs. 2 and 3, enable the shaft to be connected to and disengaged from the pulley at will. Secured upon the shaft and within the casing is a pocket-wheel 61. This may be in one piece, if desired; but in practice I have used, and hence have shown, a plurality of disks having peripheral flanges connected transversely by radial ribs 62. Four of such disks are shown in Fig. 9 set on the shaft with their ribs alternating or staggered, making four parallel series of pockets. Adjacent to the wheel is a shield 63, secured to the casing and comprising an inclined plate terminating in a curve substantially concentric with the wheel. This shield, in combination with the wheel and the stop-plate 64, Fig. 1, forms a kind of hopper in which a little of the material accumulates and by which it is distributed among the pockets of the rotating wheel. The bottom of casing 55 is open and communicates with hopper 17. The arrangement of a number of pockets on the periphery of the feed-wheel distributes the material so that it leaves the wheel and enters the weighing-bucket in a practically-uniform stream and not in separate charges. This stream is constantly running, and hence it always furnishes an amount additional to each charge from the tumbler. The small accession of material makes up with perfect accuracy the short weight of the main charge, and therefore at the right instant the bucket sinks, discharges the correct weight of material, shifts its own bottom and deflecting-gate, unlocks the tumbler, and is ready for a new charge in its other compartment.

Since what I have termed the "minor feed" runs constantly, while the main feed depends for its operation upon the movement of the weighing-bucket, it is evident that in the automatic operation of this machine the first amount weighed and delivered by the weighing-bucket will be received entirely through the said minor feed. After this first mass of material has caused the bucket to operate the relation between said bucket and the tilting tumbler is established and maintained during the subsequent operation of the machine in the manner before described. Of course, however, the bucket can in the first instance be operated by hand, if desired, in order to establish the said relation.

I do not limit myself to the exact specific construction and arrangement herein described, and shown in the drawings, as I desire to avail myself of such modifications and equivalents as fall properly within the spirit of my invention.

Having thus fully described my invention, what I claim as new, and desire to secure by Letters Patent, is—

1. In a weighing apparatus, the combination with a compartment weighing-bucket, of a compartment oscillating measuring-tumbler, means for regulating the capacity of the compartments of the measuring-tumbler, and separate but connected locking devices for the bucket and for the tumbler.

2. In a weighing apparatus, a tilting measuring-tumbler, having hinged adjustable wings forming a partition in said tumbler, substantially as and for the purpose set forth, in combination with a source of supply and with a scale-beam and a weighing-bucket supported thereby.

3. In a weighing apparatus, a tilting measuring-tumbler having pivoted wings forming a partition for dividing it into two compartments, slots formed in opposite sides of said tumbler and bars projecting through said slots for adjusting said wings and thereby regulating the capacity of said compartments.

4. In a weighing apparatus, a tilting measuring-tumbler, a rock-shaft on which it is mounted, a notched segment on said shaft, a spring-pressed bolt for engaging said notches alternately, a weighing-bucket having a limited vertical movement, and connections set in operation by the movement of said bucket, for disengaging said bolt from said segment.

5. In a weighing apparatus, a weighing-bucket, means for supplying successive charges of material thereto, and means for supplying an auxiliary portion of material independently and constantly, comprising a supply-passage, a wheel therein having peripheral staggered pockets, and means for rotating said wheel.

6. In a weighing apparatus, a wheel for auxiliary supply, comprising a number of flanged disks fixed upon a common shaft, and provided with transverse peripheral ribs, said disks being set upon the shaft so that said ribs are staggered in arrangement.

In testimony whereof I have affixed my signature, in presence of two witnesses, this 25th day of July, 1902.

GEORGE HOEPNER.

Witnesses:
L. W. SEELY,
GEO. T. KNOX.